United States Patent [19]

Lagana' et al.

[11] 4,298,041
[45] Nov. 3, 1981

[54] APPARATUS FOR DISPENSING FILM-LIKE LIQUID INTO VERTICAL PIPES

[75] Inventors: Vincenzo Lagana'; Riccardo Pasero, both of Milan, Italy

[73] Assignee: Snamprogetti S.p.A., Milan, Italy

[21] Appl. No.: 97,786

[22] Filed: Nov. 27, 1979

[30] Foreign Application Priority Data

Dec. 15, 1978 [IT] Italy .............................. 30886 A/78

[51] Int. Cl.³ .............................................. B65B 3/06
[52] U.S. Cl. ..................................... 141/392; 141/86; 118/501; 165/DIG. 19
[58] Field of Search ............... 141/234, 237, 238, 286, 141/311 R, 392, 86; 118/500, 501; 134/22 C, 166 C, 167 C, 168 C, 169 C; 138/37; 165/186, DIG. 19

[56] References Cited

U.S. PATENT DOCUMENTS 2,318,206  5/1963  Eisenlohr .............................. 138/37

Primary Examiner—Houston S. Bell, Jr.
Attorney, Agent, or Firm—Morgan, Finnegan, Pine, Foley & Lee

[57] ABSTRACT

This invention relates to an apparatus for distributing liquid in the form of film within vertical tubes. The apparatus is constituted by a solid cylindrical member inserted as a plug into each tube at the upper end thereof. Said member is provided with an upper ledge, a lower cavity forming a circular rim at its base, and helical outer grooves extending also in the ledge and having a depth less than the thickness of said rim.

7 Claims, 4 Drawing Figures

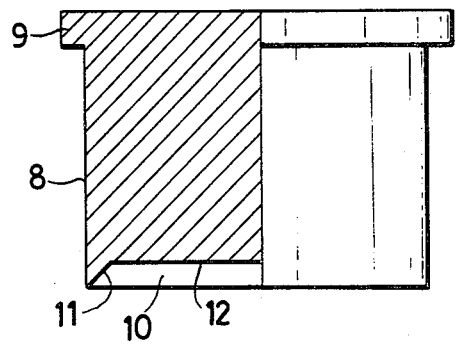
Fig.2
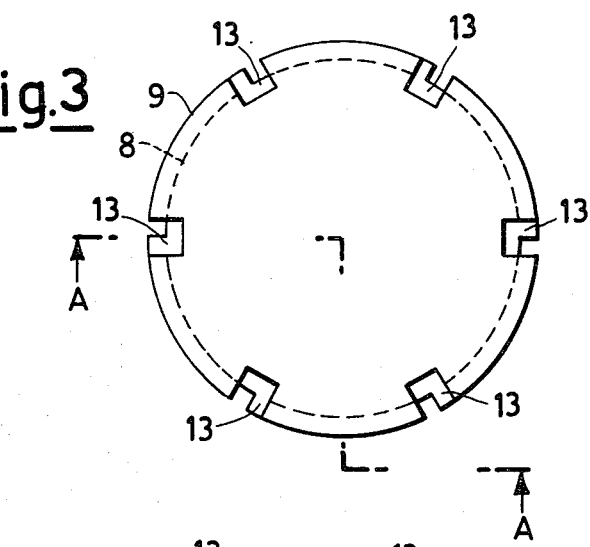
Fig.3
Fig.4
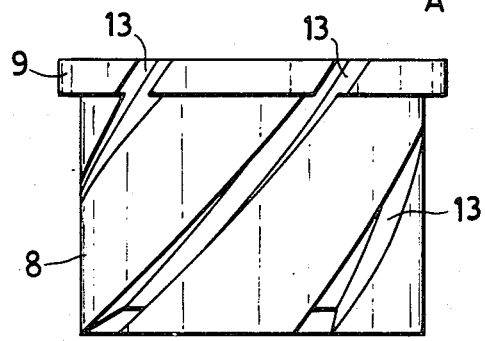

APPARATUS FOR DISPENSING FILM-LIKE LIQUID INTO VERTICAL PIPES

This invention relates to an apparatus for distributing liquid in the form of film over the inside of vertical tubes. More particularly, the invention relates to an apparatus for distributing liquid in the form of film over the inside of film heat exchangers.

Mention is made particularly of the distribution of liquid in the form of film in apparatus involving heat transfer, merely because film apparatus has found its major application in connection with the removal or supply of heat, but the invention is obviously not limited to this.

A known system for effecting heat transfer with partial evaporation of a liquid phase or absorption of a vapour or gas phase in a liquid phase is that known as the thin falling film system.

This system consists of creating, on the inside of a certain number of tubes disposed with their axis vertical and constituting the heat transfer surface, a uniform layer of liquid adhering to the walls which flows from the top downwards under the force of gravity.

Such an apparatus consists of an upper liquid accumulator having as its base the upper tube plate of the tube bundle, a vertical tube bundle, and a liquid receiver below the tube bundle, the roof of which is formed by the lower tube plate of the bundle.

The upper end of the tubes, which forms the inlet mouth for the liquid, is not left free because in such a case the liquid would tend to spill over beyond the walls instead of forming a regular film on them. The inlet mouth of the tubes must therefore be provided with a suitable distributor to favour film formation.

These distributors are normally in the form of pipe portions having at their top a series of tangentially disposed bores or slots, through which the liquid flows, and by being subjected to rotary motion tends to wet the entire inner circumference of the pipe portion and thus the inner surface of the tube as it falls downwards.

If they are not correctly designed, these pipe portions can cause part of the liquid to form droplets in the inner section of the tube without adhering to the wall. They also inevitably tend to occupy a consistent segment of the upper portion of the tube, which is thus lost for heat exchange purposes.

A further advantage of this type of pipe portion, which occurs when working in the presence of corrosive liquids, is the occurrence of heavy corrosion in the tubes in the region immediately below the lower end of the pipe portions. This is due to the formation of turbulence at the liquid step between the wall of the pipe portion and the wall of the tube.

A further consistent disadvantage is the cost of manufacture determined by the complexity of the form to be made and the machining accuracy necessary due to the boring of the pipe portion with bores which have their inner mouth tangential to the inner cylindrical or conical surface of the pipe portion.

The liquid film distribution apparatus according to the present invention surprisingly obviates the aforesaid drawbacks. It can also operate over wide variations in flow rate, such as to ensure perfect film formation on the inside of the tubes both for high flow rates and for very small flow rates, such as occur during periods of transient operation or during special maintenance operations for cleaning purposes, such as chemical washing.

The apparatus according to the present invention consists of a solid cylindrical member which is inserted in the manner of a plug into each of the tubes at the upper tube plate of the tube bundle of the vertical tube heat transfer apparatus. The cylindrical member is provided with a ledge at its top end, the purpose of which is to limit the insertion of the distributor into the tube.

The cylindrical member is provided at its lower end, i.e. at the other end to the ledge, with a cavity such as to provide a lower edge in the form of a circular rim, said cavity, preferably of cone frustum shape, having its lateral cone frustum surface inclined at between 20° and 60°, preferably 40°, to the axis of the cylindrical member, and having a flat roof.

Grooves are provided in the lateral surface of the cylindrical member, their number varying between a minimum of two and a maximum which depends on the dimensions of the member, and consequently on the tube on which said member is fitted, and generally in any case not greater than twenty.

The grooves are also provided in the ledge.

The grooves extend over the outer surface of the cylindrical member helically, at a pitch which is between 180° and 18°.

They have a preferably rectangular cross-section, but polygonal or circular segment cross-sections can also be chosen.

The maximum depth of the grooves is between 0.05 and 10 mm, and is less than the thickness of the base rim.

The operation of the apparatus is as follows:

The liquid on the upper tube plate of the vertical tube bundle enters the ducts formed by the groove and inner surface of the tube into which the cylindrical member is inserted, runs through the whole of said duct and becomes distributed in the form of a film over the tube below the cylindrical member.

The invention is described hereinafter with reference to the accompanying FIGS. 1, 2, 3 and 4, which represent respectively:

A. A vertical sectional view of the heat transfer system with all its components, with particular reference to the distributors according to the present invention (FIG. 1). The figure shows the upper liquid accumulator 1 with the upper tube plate 2 as its base, the tube bundle 3 constituted by the vertical tubes, and the receiver 5 for the liquid arriving from the tube bundle and fixed to the lower tube plate 4. The liquid distributors 6 are inserted into the upper mouth of the vertical tubes.

B. The constructional details of the distributor according to the present invention are shown in FIGS. 2, 3 and 4. The distributor is constituted essentially by a cylindrical member 8 which is inserted, with narrow tolerance and slightly forced, completely into the upper end of the vertical tubes, and comprises at its top a ledge 9, the purpose of which is to exactly limit the insertion of the distributor into the tube.

The bottom end of the distributor is provided with a convex cavity 10, of which the lateral surface 11 is inclined at 40° or at any other angle, and the roof 12 is flat.

FIG. 2 is a simplified section on the line A—A of FIG. 3, i.e. without the liquid discharge grooves 13.

FIG. 3 is a plan view of the complete distributor with the grooves 13 which appear in the side view of FIG. 4.

Figure 1:
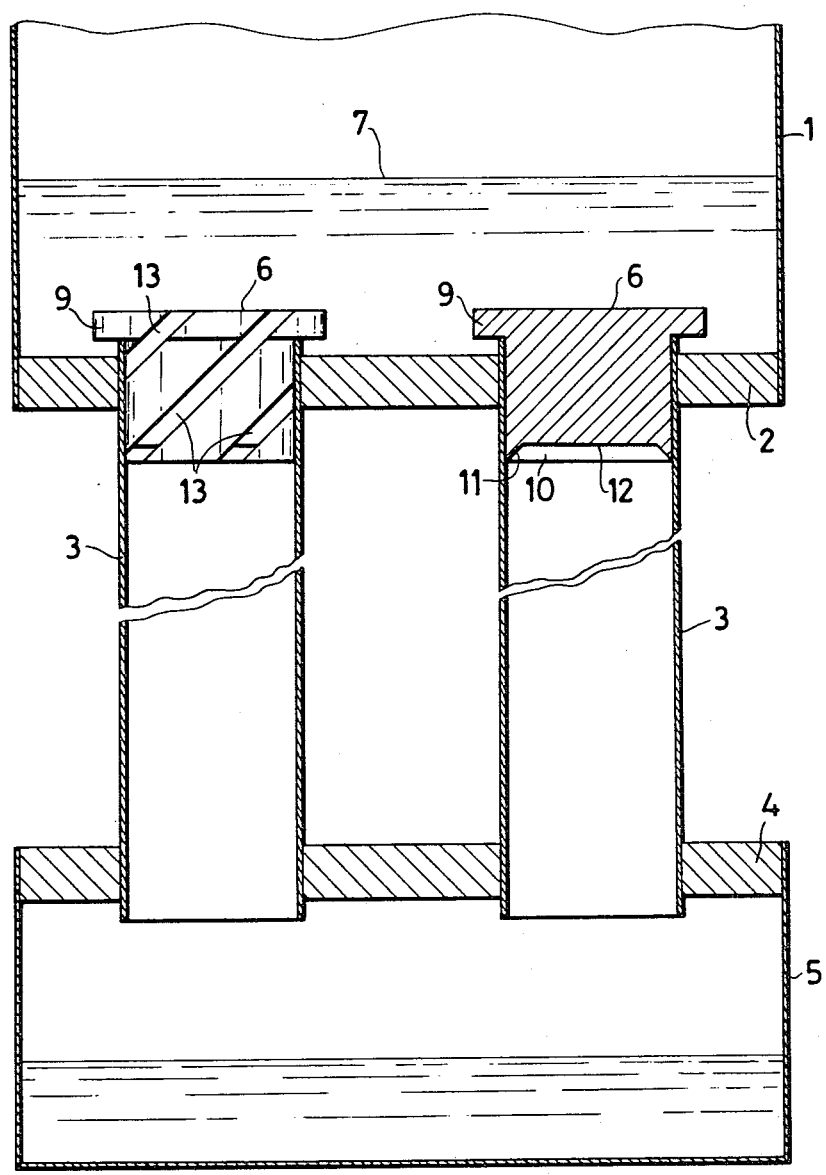

The grooves 13 are preferably six in number, but can also be of greater or lesser number according to requirements.

The slope of the grooves is normally 45°, but this angle can be greater or smaller according to operational requirements.

The fact that the liquid is already in contact with the tube surface on the outside of the grooves avoids the problem, which is present in the normal distribution pipe portions, of the step in the liquid film between the pipe portion and the tube at the lower end of the pipe portion, with the consequent corrosion phenomena due to turbulence in the case of corrosive liquids as stated heretofore.

Six grooves in number, all arranged at a slope of 45°, is considered the optimum design to obtain continuity of the liquid film in the extremely small space below the distributor. Furthermore, the distributor is inserted into the tube by only a small distance, such that the sum of this distance and the distance required for forming the continuous film does not exceed the normal thickness of the tube plate, and therefore there is no decrease in the heat transfer surface.

The provision on the bottom of the distributor of the cone frustum cavity 10 with its lateral surface normally inclined at 45° prevents any danger of the liquid running towards the centre of the tube by surface adherence to the bottom of the distributor, with part of the liquid therefore not forming the liquid film.

The circular rim at the base of the cavity must always be thicker than the depth of the grooves, so as to ensure the required operation.

FIGS. 2, 3 and 4 emphasise the intrinsic robustness of the distributor design, coupled with its constructional simplicity, which leads in consequence to a very low constructional cost.

We claim:

1. A distributor for causing liquid to be conveyed in the form of a film on the inner walls of essentially vertical tubes open at their top ends to an accumulator containing the liquid to be distributed and open at their bottom ends to a receiver for the distributed liquid, comprising:
   cylindrical members slidably insertable in the upper ends of the tubes, wherein each of said members includes:
   a ledge at its upper end which abuts the upper end of the tube to limit the insertion of said member to the upper end thereof,
   helical grooves in the outer surface of said member which extend from the top of said ledge to the bottom of said member and which are open to the inner wall of the tube therebetween for receiving the liquid from the accumulator and conveying such liquid within and along the length of said helical grooves and from the lower ends thereof onto the inner tube wall, and
   a convex circular rim at the lower end of said member which directs the flow of the liquid from said grooves outwardly onto the inner tube wall where it forms a film of liquid thereon and flows downwardly along its length into the receiver.

2. An apparatus as claimed in claim 1, wherein the helical grooves have a pitch of between 180° and 18°.

3. An apparatus as claimed in claim 1, wherein the helical grooves have a cross-section in the form of a polygon or circular segment, and preferably a rectangle.

4. An apparatus as claimed in claim 1, wherein the helical grooves are from two to twenty in number.

5. An apparatus as claimed in claim 1, wherein the helical grooves have a maximum depth of 10 mm.

6. An apparatus as claimed in claim 1, wherein the cavity is of cone frustum shape with its lateral cone frustum surface inclined at between 20° and 60°, preferably 45°, and has a flat roof.

7. A distributor as claimed in claim 1, wherein the essentially vertical tubes are heat exchangers.

* * * * *